United States Patent [19]

Evin

[11] Patent Number: 5,063,337

[45] Date of Patent: Nov. 5, 1991

[54] ELECTRIC MOTOR REGULATION TO OBTAIN DESIRED SPEED CURVE

[76] Inventor: Jean Evin, Hameau de la Becque, Avelin 59710 Pontaillancq, France

[21] Appl. No.: 432,725

[22] PCT Filed: Apr. 22, 1988

[86] PCT No.: PCT/FR88/00198

§ 371 Date: Oct. 20, 1989

§ 102(e) Date: Oct. 20, 1989

[87] PCT Pub. No.: WO88/08477

PCT Pub. Date: Nov. 3, 1988

[30] Foreign Application Priority Data

Apr. 23, 1987 [FR] France .................. 87 05962

[51] Int. Cl.$^5$ .............................................. B66B 13/08
[52] U.S. Cl. ................................. 318/617; 318/266; 318/466; 187/103
[58] Field of Search ..................... 318/280–293, 318/430–468, 560–640; 49/25, 13, 28, 29, 31, 141, 215, 210, 214, 264, 340

[56] References Cited

U.S. PATENT DOCUMENTS

| 4,299,308 | 11/1981 | Shung et al. ................ 187/103 |
| 4,300,660 | 11/1981 | Schoenmann et al. ........ 187/103 |
| 4,300,661 | 11/1981 | Hmelovsky ................... 187/103 |
| 4,300,662 | 11/1981 | Hmelovsky ................... 187/103 |
| 4,300,663 | 11/1981 | Hmelovsky et al. ....... 318/617 X |
| 4,305,480 | 12/1981 | Hmelovsky ................... 187/103 |
| 4,305,481 | 12/1981 | Hmelovsky et al. ....... 318/617 X |
| 4,342,378 | 8/1982  | Hmelovsky ................... 187/103 |
| 4,342,379 | 8/1982  | Games et al. ............ 318/561 X |
| 4,498,033 | 2/1985  | Aihara et al. ............ 318/466 X |
| 4,775,823 | 10/1988 | Yoshida et al. .............. 318/266 |

Primary Examiner—William M. Shoop, Jr.
Assistant Examiner—Paul Ip
Attorney, Agent, or Firm—Kerkam, Stowell, Kondracki & Clarke

[57] ABSTRACT

Regulation of the speed of an electric motor is accomplished by counting the number of periods of AC current and modulating the pulses supplied to the motor. The speed of the motor is regulated according to a speed reference curve. The technique is especially suitable for operating a motor which controls a door.

12 Claims, 2 Drawing Sheets

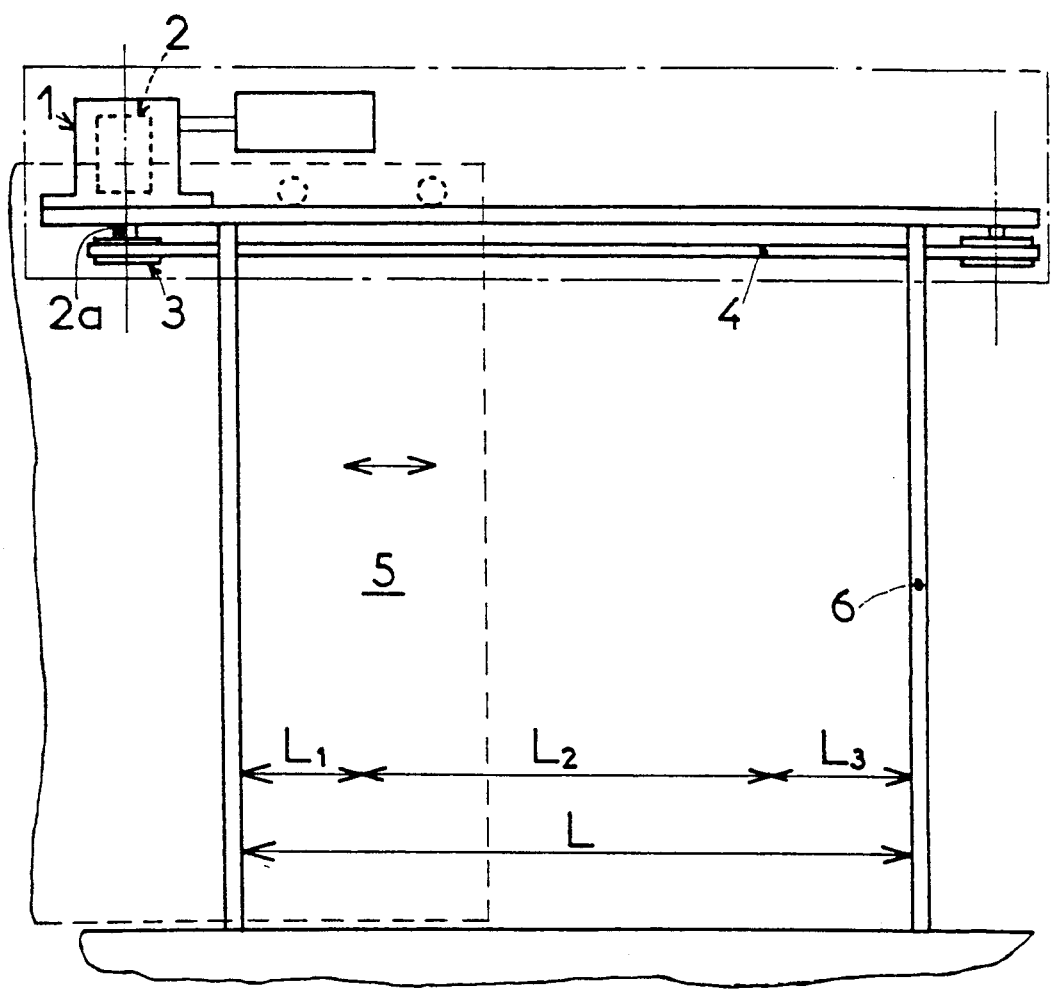
_Fig:2_

ELECTRIC MOTOR REGULATION TO OBTAIN DESIRED SPEED CURVE

The invention relates to a method of regulating the rotational speed of an AC electric motor, particularly an asynchronous motor, supplied at a frequency varying according to a reference between two endmost adjustable angular positions of the rotor spaced apart by an adjustable number of rotor revolutions and in which positions the speed is zero.

The invention also relates to the means for implementing this method as well as to the motors equipped with such means.

More particularly, but not exclusively, the field of application of such a method is in the equipment for opening and closing linearly moving doors such as those equipping passenger lifts or goods lifts, even the entrances to buildings.

In this field, the motor is associated with transmission members driving at least one leaf of a door between two positions in which the door is either opened or closed which, depending on the transmission ratio, corresponds to a certain number of revolutions of the rotor between the two said endmost positions adjusted in particular on installation as a function of the width of the door.

So as to prevent doors from having sudden movements, prejudicial to the mechanical strength, the doors must have a movement which is accelerated from their zero starting speed up to a level speed then a movement slowing down to the zero speed on arrival.

For this, using a cranked link system it is known to transform the uniform circular movement generated by the shaft of the motor into a substantial reciprocating movement whose speed is a sinusoidal function.

These transmission members are however cumbersome, costly and limited to doors of similar size.

Particularly for lift doors, and for obvious safety reasons, the standards in force fix a maximum closing energy and so a maximum closing speed.

Except with doors of a type such that, when fully open, they would present risks of squeezing, these standards and reasons practically do not exist on opening of the doors which may then generally take place at a speed substantially greater than that for closing, if only for accelerating evacuation of the cabin.

To avoid at least the drawback of cumbersomeness, doors are known whose transmission members form a screw-nut system in which the screw, driven in rotation by the motor, may have a variable pitch, by means of which the doors, during their opening or closing movements, are driven with a movement which, in a final phase, is accelerated then uniform and finally decelerated.

Of course this system is of relatively simple design and is only adaptable to a door of given width.

In order to adapt to doors of variable width within wide limits, it is known to control the opening and closing of doors having at least one leaf and with linear movement by means of an endless belt on which is fixed a member for connection with the leaf.

In order to regulate the speed of such a leaf, not only for opening but also for closing and particularly for slowing it down in the vicinity of its ends of travel, it is of course possible to act at the level of the motor instead of acting at the level of the transmission members.

In a closely related application, a method is in fact known (DE-A-2 625 397) and means for regulating the rotational speed of an AC electric motor, particularly an asynchronous motor, fed at a frequency varying in accordance with a reference between two endmost angular positions of the rotor, spaced apart by an adjustable number of rotor revolutions and in which endmost positions the speed is zero.

Associated with the transmission member such as screw or belt, the motor then receives, under the control of an adequate device such as a microprocessor, a power supply which varies depending on a reference as a function of the state of the signals representing the position of the leaf during its travel so as to identify the part of the reference which applies.

The opening and closing of the doors may thus take place at optimum speed.

Although such an assembly, which is relatively simple, makes it possible to regulate at will the closing speed and the opening speed of the doors, for it to be operational it requires the generation of said signals representative of the position of the leaf and so of information external to said assembly.

In order to provide such external information it is known to dispose, along the travel path of each leaf, sensors cooperating with a member carried by the leaf and particularly by four contacts per leaf, two of which are end of travel and two of which are for changing speed at a certain distance from the end of travel.

To generate their information, these sensors must be fed by an external circuit which, because of the number of sensors, the length of the cable used for the connection to the control cabinet as well as the mechanical characteristics which such connection requires, increases the risks of damage and contributes to increasing the cost price of such a device.

BRIEF SUMMARY OF THE INVENTION

It may be thought that it is possible to use a counter for determining the number of revolutions of the rotor from the detection of the number of notches carried by a disk associated with the drive shaft or by a ribbon parallel to the travel path which would however be too costly.

The aim of the invention is to provide a method of regulating a three phase AC electric motor with a single winding which, for example, used for driving at least one particularly linearly moving door leaf for opening or closing, does not require information elaborated outside the assembly formed by the motor with its supply means and the transmission members.

For this, the invention has as object a regulation method of the above mentioned type characterized in that:

on initialization, depending on the angular movement of the rotor which it is desired to obtain, which is predetermined as a function of a specific application:
  the total theoretical number of complete periods of the AC current required for feeding the motor for driving it over such an angular movement is determined, whether by calculation or experimentation;
  this total theoretical number is stored in a memory,
  depending on the order number of these complete periods in this total theoretical number, even on the direction of the controlled rotational movement, a table is formed of the variations of the supply for the motor to be provided for theoretically complying with a predetemined speed reference, during use:
the instantaneous real number of complete periods of the AC current supplying the motor is counted from the initial angular position,
depending on the value of each instantaneous real number, even on the direction of the controlled rotational movement, the supply to the motor is matched to the value given by the table for the corresponding intermediate theoretical number. The invention also has as object the means for implementing this method.

BRIEF DESCRIPTION OF THE DRAWINGS

The invention will be better understood from the following description, given by way of non limitative example, with reference to the accompanying drawings which show schematically:

FIG. 2, a linearly moving door equipped with means implementing the method.

DETAILED DESCRIPTION

Figure 1:
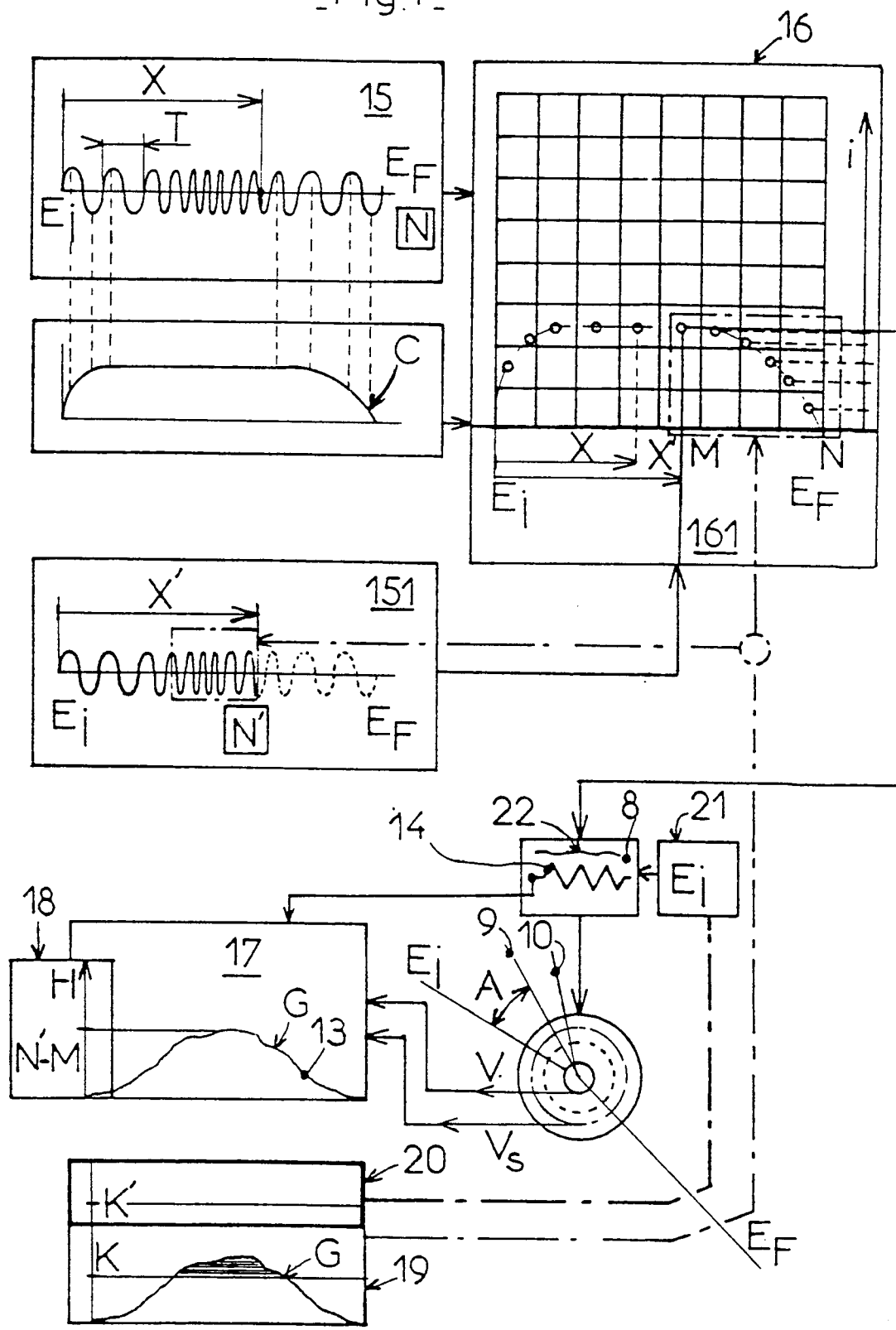
FIG. 1, the block diagram of the method.

Referring to the drawings (FIG. 2), an electric motor 1 can be seen, such as an asynchronous motor, fed at a frequency which varies in accordance with a reference, whose rotor 2 has its shaft 2a coupled to a pulley 3 driving an endless belt 4 passing over a guide pulley and whose strands are parallel to the direction and have a length at least equal to the amplitude of the given movement L for opening and closing the leaf 5 of linearly moving doors such as those equipping lifts, which leaf is then connected in translation to one of the strands of the belt by any known means (not shown).

To comply with the standards in force, while accelerating the evacuation of the cabin, the leaf is preferably driven with a movement whose opening speed is greater than that for closing.

Furthermore, these respective speeds are variable over different sections of the travel path in order, over a first section $L_1$, to start at a given acceleration before reaching a level speed maintained over a second section $L_2$, then, over a third adjustable section $L_3$, to slow down progressively, since it is in the vicinity of its end of travel, here assumed against the upright 6 of the door frame.

Such acceleration level speed and deceleration are, for the different sections, predetermined and form a reference "C" accessible to the installation and fixing for each point of the movement the values of the current with which the motor should be supplied for obtaining the desired evolution of the speed.

This amplitude L determines, for motor 1, an operating range limited by an initial state $E_I$ and a final state $E_F$ corresponding respectively to a totally open position or a totally closed position of leaf 5.

Thus therefore, in order to control the rotation of rotor 2, from the initial state $E_I$ to the final state $E_F$ at a speed varying in agreement with the reference C, according to the invention:

on initialization, depending on the angular movement of the rotor 2 which it is desired to obtain, which is predetermined as a function of the specific application:
the total theoretical number N of complete periods T of the AC current i required for feeding the motor 1 for driving it over such an angular movement is determined, whether by calculation of experimentation;
this total theoretical number N is stored in a memory, depending on the order number X of these complete periods T in their total theoretical number N, even on the direction of the controlled rotational movement, a table is formed of the variations of the power supply for the motor 1 to be provided for theoretically complying with a predetermined speed reference C, during use:
the instantaneous real number N' of complete periods of the AC current i supplying the motor 1 is counted from an initial endmost position,
depending on each value of X' of the instantaneous real number, even on the direction of the controlled rotational movement, the supply to the motor is matched to the value given by the table for the corresponding intermediate theoretical number M.

Depending on the load driven by motor 1, a shift may appear between the actual position 9 of rotor 2 and position 10 obtained by counting the periods of the signal 7 causing its rotation.

In this case, in order to take such a shift into account, in accordance with the invention:
a signal G is elaborated representative of the so-called "slipping" difference between the speed of synchronism $V_S$ of the motor and the actual rotational speed V of its rotor 2.

Depending on the level H of the slipping signal G and on the angular position A of rotor 2, the at least foreseeable difference between the actual number N' of periods of the current having supplied motor 1 and the corresponding intermediate theoretical number M over at least a part of the movement between the endmost positions $E_I$ and $E_F$ is evaluated. Depending on this difference, at least for a certain level K of this signal G, a partial compensation of the slipping effect is induced.

For such compensation, in a preferred embodiment, in the table, for the remainder of the angular difference of the movement in progress, a correction factor is applied to at least an initially provided part of the values.

In a variant, depending on the direction of compensation, the actual number N' of counted periods is corrected by increasing or decreasing.

Similarly, this slipping signal G is compared with a maximum threshold K' and, as soon as crossing of this maximum threshold has been detected, instead of seeking a compensation, the reverse rotation of the rotor is commanded so that it comes back to its initial position $E_I$.

This method is further characterized in that, particularly at level speed, determining the signal 13 representative of slipping G the intensity i of the current feeding the motor is measured.

During slowing down, which produces an overcurrent, another reference value is used.

Such slipping may obviously occur in one direction or in the other for example because the leaf meets an obstacle or conversely when its movement is assisted.

Possible slipping of rotor 2 caused by an abnormal load acting positively or negatively on leaf 5 will cause, inside the circuit supplying the motor, a current variation measured for example at the terminals of one of its components such as resistor 14.

Preferably, for initializing the assembly, the theoretical number N of complete periods is determined by experimentation, by counting the number of complete periods during movement of the leaf from one endmost position to the other by means of motor 1 fed at low frequency then carrying out a second reading at normal frequency.

Depending on the normal forces, the installer may correct the reference to enter a precompensation. Moreover, on arrival at the endmost position, an additional frequency may be added to the reference which applies a holding torque braking the bouncing effect of the door.

The means for implementing the control method are mainly characterized in that they comprise:

- a means 15 for determining and storing the total theoretical number N of complete periods T of the AC current i feeding the motor 1 required for going from one endmost position $E_I$ to the other $E_F$,
- a means 16 which, depending on the order number X of each of these periods T in their total number N, establishes a table of the variations of the power supply to be provided for the motor for theoretically complying with a predetermined speed reference,
- a means 151 for counting the instantaneous real number N' of complete periods of the current i supplying the motor 1 from an endmost position $E_I$ to the other endmost position $E_F$,
- a means 161 which, depending on each value X' of the instantaneous real number N', even on the direction of the movement, adapts the power supply of motor 1 to the value given by the table for the corresponding intermediate theoretical number M.

The means further comprise:

- a means 17 for elaborating a signal G representative of said "slipping" difference between the synchronism speed $V_S$ of the motor and the real speed V of rotation of its rotor 2,
- means 18 which, depending on the level H of the slipping signal G and on the angular position A of rotor 2, evaluates the at least foreseeable difference between the instantaneous real number N' of periods of the current supplying the motor 1 and the corresponding intermediate theoretical number M over at least a part of the movement between the endmost positions $E_I$ and $E_F$,
- a means 19 which, at least for a certain level K of this slipping signal G, induces at least a partial compensation of the slipping effect.

For this, this means applies in the table for the rest of the angular difference of the movement in progress, a correction factor to at least a part of the initially provided values, or increases or decreases the real number N' of counted periods.

The means further comprise:

- a means 20 for comparing the slipping signal G with a maximum threshold K' and
- a means 21 which, as soon as crossing of this maximum threshold K' is detected, instead of seeking a compensation, controls either, particularly in the case of a shock, the reverse rotation of the rotor so that it comes back to its initial position $E_I$ or, particularly on opening, stopping then resetting before the movement is resumed.

In combination with these means the door may comprise detectors, e.g. proximity detectors, avoiding squeezing between the leaves of the door.

In an advantageous embodiment, the means 17 for determining slipping G consist of a circuit 22 for detecting any abnormal variation of the intensity i of the current in the circuit feeding the motor.

In a preferred embodiment, the electric motor 1 is a three phase asynchronous motor and the AC current comes from a generator 8 formed by a pulse width modulated inverter.

These pulses come from three arms of the inverter each controlling one of the phases of the motor.

Each of the arms is for this purpose formed of two transistors switched at the desired frequency from a control device.

The resultant supply frequency may be greater than the normal frequency of use of the asynchronous motor.

This type of inverter makes it possible to obtain a voltage which is variable in amplitude and in frequency for example from a fixed DC voltage.

The advantage of this type of generator is that it makes it possible to read the frequency value and to detect the changes of periods and so facilitate counting thereof.

I claim:

1. Method of regulating an alternating current electric motor having a rotor and connected to receive power from a power supply with an output which is variable depending on a predetermined speed reference (C) between two adjustable endmost angular positions ($E_I$ and $E_F$) of the rotor spaced apart by an adjustable number of rotor revolutions and in which positions the speed is zero, this method comprising:

(A) initialization by the steps of: determining a theoretical number (N) of complete periods (T) of AC current (i) required for feeding the motor to drive the rotor over angular movement between the endmost angular positions ($E_I$ and $E_F$), storing the theoretical number in a memory, storing a table having an output providing variations in the power supply to theoretically achieve the predetermined speed reference (c) based on a chronological position (x) of said complete periods (T) in the theoretical number (N), and (B) operating the motor to provide the predetermined speed reference (c) by the steps of:
   counting an instantaneous number (N') of complete periods of AC current from a first one of said endmost angular positions to a second one of said endmost angular positions, and controlling the power from the power supply to the motor by accessing the stored table based on the instantaneous number (N').

2. The method of claim 1 wherein the controlling of power step is accomplished by changing the frequency of the power.

3. The method of claim 1 wherein the motor is asynchronous.

4. The method of claim 1 further comprising:
   generating a slipping signal (G) representative of slipping difference between a speed of synchronism of the motor and a real rotational speed of the rotor,
   depending on a level (H) of the slipping signal (G) and on an angular offset (A) of the rotor (2) from one of the endmost angular positions, evaluating a difference between the instantaneous number (N') of periods of the current supplying the motor and a corresponding theoretical number (M) of periods of the current to reach said angular offset (A) over at least a part of the movement between said endmost angular positions ($E_I$ and $E_F$), providing at least a partial compensation of the slipping effect by making the power from said power supply at least partially dependent on said difference at least for a certain value (K) of said slipping signal.

5. The method of claim 4 wherein the compensation is provided until the rotor stops at one of its endmost positions by accessing the stored table based on the instantaneous number (N') as modified by a correction factor.

6. The method of one of claims 4 and 5 further comprising the steps of:
comparing the slipping signal to a maximum threshold (K'), and upon the slipping signal exceeding the maximum threshold (K'), instead of providing compensation, reversing the direction of the motor until the rotor rests at one of its endmost positions.

7. The method of any one of claims 4 and 5 further comprising the steps of:
comparing the slipping signal to a maximum threshold (K'), and, upon the slipping signal exceeding the maximum threshold (K'), instead of providing compensation, stopping the motor temporarily before resuming the movement.

8. A system for regulating an alternating current electric motor comprising:
means (15) for determining and storing a total theoretical number (N) of complete periods (T) of AC current feeding the motor (1) required for going from a first endmost position ($E_I$) to a second position ($E_F$);
means (16) which, depending on a first chronological position (X) of each of said periods (T) in a total number, establishes a table of variations of a power supply to be provided for the motor for theoretically complying with a predetermined speed reference (C);
means (151) for counting a real number (N') of complete periods of current supplying the motor from the first endmost position to the second endmost position ($E_F$); and
means (161) which, depending on a second chronological positon (X') of the real number (N'), adapts the power supply to a value determined by the table.

9. A system according to claim 8, further comprising:
means (17) for generating a signal (G) representative of a slipping difference between a synchronism speed ($V_S$) of the motor and a real speed (V) of rotation of a rotor (2) of the motor; and
means (18) which, depending on a level (H) of the slipping signal (G) and on a angular position (A) of the rotor (2), evaluates a difference between the real number N' of periods of the current supplying the motor (1) and a corresponding theoretical number (M) over at least a part of the movement between the endmost positions ($E_I$) and ($E_F$).

10. A system according to claim 9 further comprising:
means (19) which, at least for a certain level (K) of the slipping signal (G), provides at least a partial compensation of the slipping effect by making the power from the power supply at least partially dependent on said difference.

11. A system according to claim 9 further comprising:
means (20) for comparing the slipping signal (G) with a maximum threshold (K') and for detecting crossing of a maximum threshold (K'),
means (21) for, upon the crossing of the maximum threshold, causing reverse rotation of the rotor so that it comes back to an initial position, and
means for, upon the crossing of the maximum threshold, causing the stopping of the motor temporarily before resuming movement.

12. A system according to claim 9 characterized in that the means (17) for generating the slipping signal (G) includes a circuit (22) detecting any abnormal variation of the intensity of the current in the circuit supply the motor.

* * * * *